Oct. 9, 1951   W. G. OVENS   2,570,847
AIR INTAKE CONTROL APPARATUS
FOR GAS TURBINE POWER PLANTS
Filed Jan. 29, 1949   2 Sheets-Sheet 1
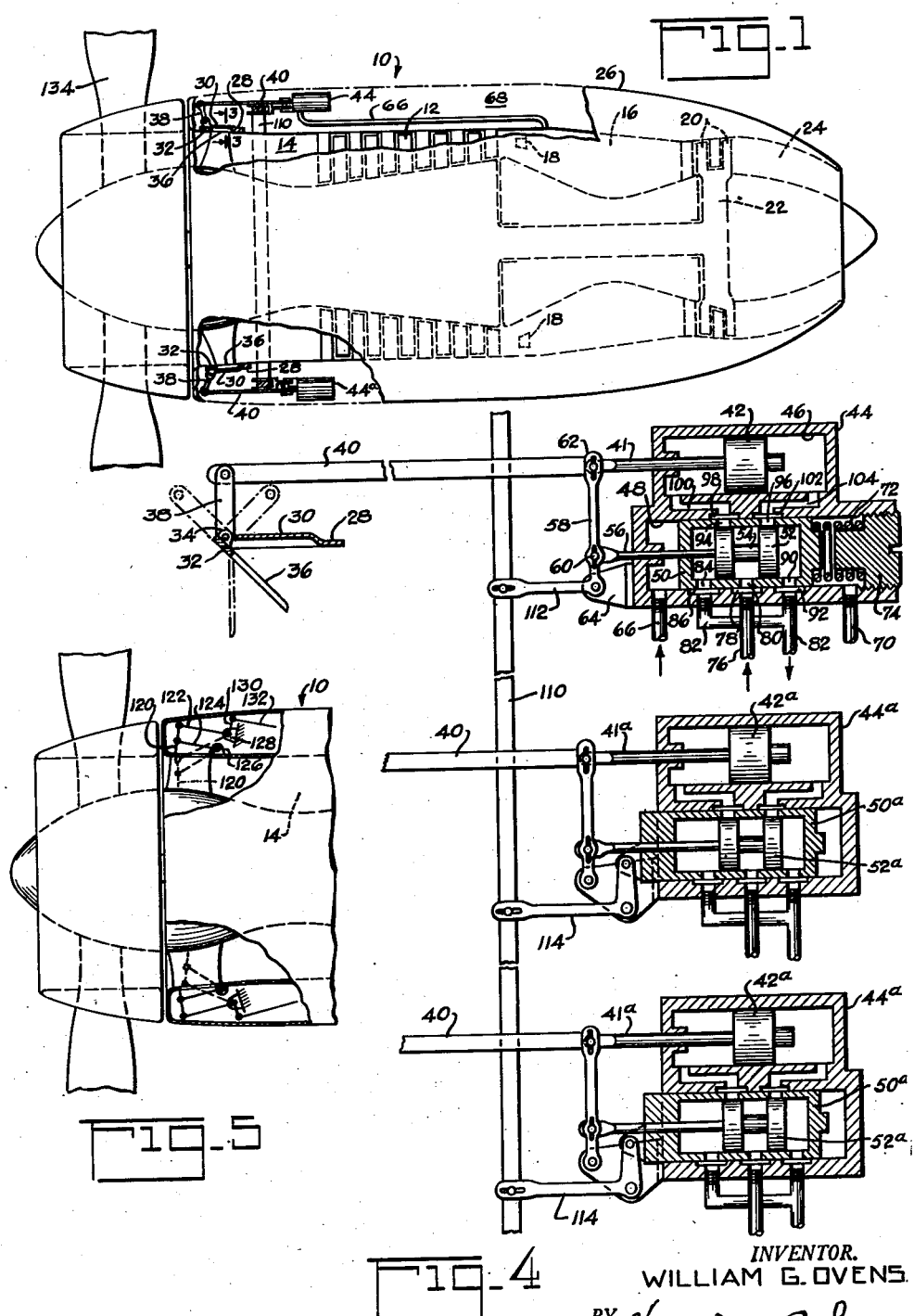
INVENTOR.
WILLIAM G. OVENS.
BY
ATTORNEY

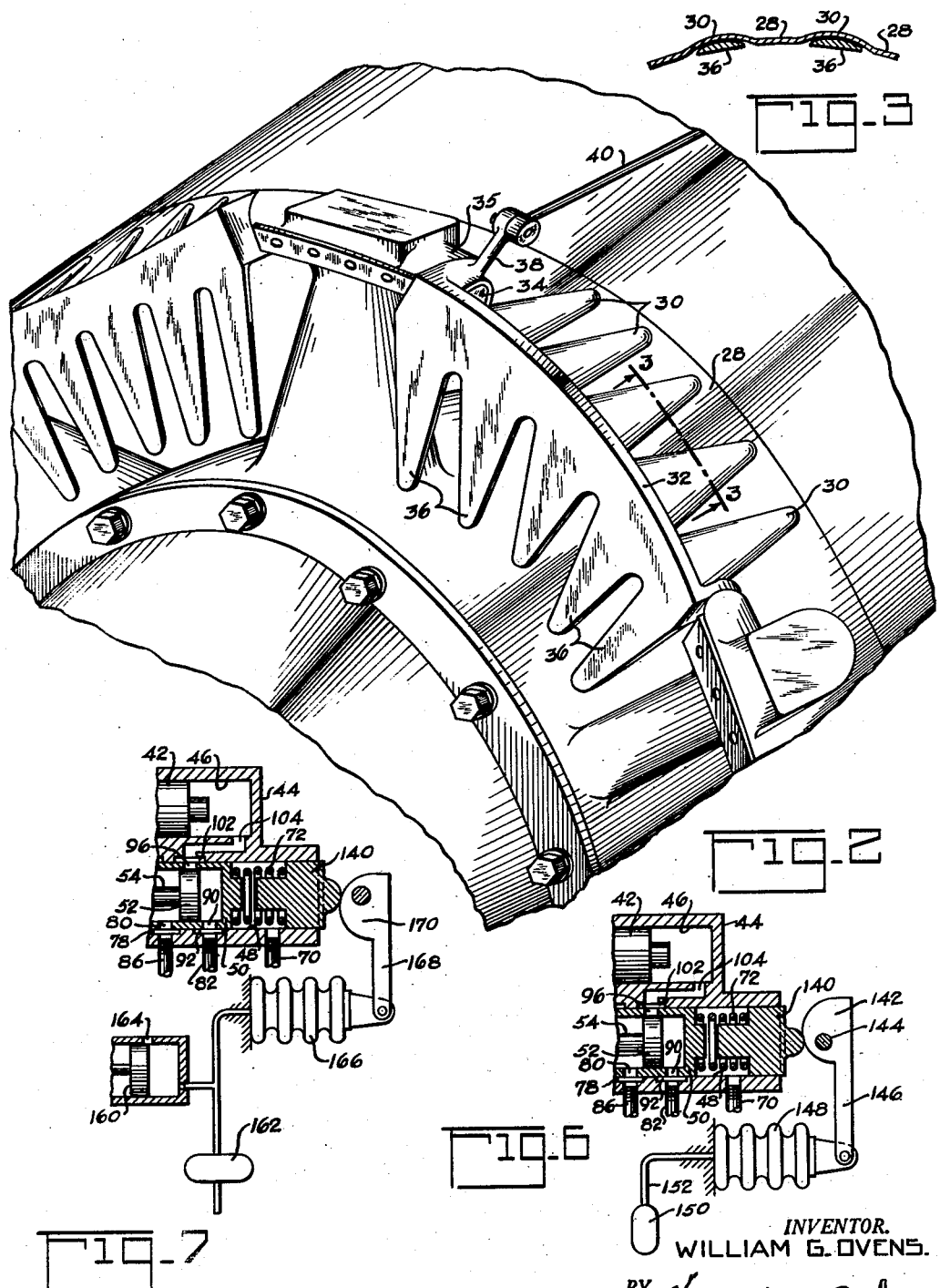

Patented Oct. 9, 1951

2,570,847

UNITED STATES PATENT OFFICE 2,570,847

AIR INTAKE CONTROL APPARATUS FOR GAS TURBINE POWER PLANTS

William G. Ovens, Ramsey, N. J., assignor to Wright Aeronautical Corporation, a corporation of New York Application January 29, 1949, Serial No. 73,613

6 Claims. (Cl. 60—39.29)

This invention relates to gas turbine engines for aircraft and is particularly directed to means for limiting the pressure within the turbine combustion chamber and/or for limiting the turbine power output.

Gas turbine aircraft engines generally comprise a forwardly directed intake duct and a compressor drivably connected to the turbine, said compressor discharging its compressed air into the turbine combustion chamber. When such a gas turbine aircraft engine is operated at or near the maximum available power at sea level in an atmosphere of low temperature and/or at high aircraft air speeds, the ram pressure of the air entering the intake duct of the compressor is such that, with the pressure increase produced by the compressor, the pressure differential across the walls of the turbine combustion chamber becomes quite high. It usually is not economically feasible or desirable to make the combustion chamber of an aircraft gas turbine power plant sufficiently strong to withstand these high or excessive internal pressures. An object of the invention comprises the provision of a novel arrangement for preventing excessive pressure differentials across the walls of the combustion chamber. In accordance with the present invention means are provided for automatically decreasing the ram pressure of the air intake of the turbine compressor whenever the turbine combustion chamber pressure exceeds a predetermined value.

If the gas turbine power plant includes an aircraft propeller drivably connected to the turbine rotor through a speed reduction gear, the torque transmitted by said reduction gear may exceed that for which said reduction gear is designed when the power plant is operated at the maximum available power at sea level in an atmosphere of low temperature and/or at high aircraft air speeds. Here again it usually is not economically feasible or desirable to design said reduction gear for such high torques. Accordingly the aforementioned means for reducing the ram pressure to the turbine compressor can also be arranged to prevent said reduction gear torque from exceeding a predetermined value. Where the control of the maximum pressure differential across the walls of the turbine combustion chamber is used to limit the propeller reduction gear torque, said control may be biased so as to decrease said maximum pressure differential with decrease in the temperature of the surrounding air since the theoretically available power output of a turbine increases with decrease in said temperature.

Other objects of the invention will become apparent upon reading the annexed detailed description in connection with the drawing in which:

Figure 1 is a diagrammatic view of a gas turbine aircraft power plant embodying the invention;

Figure 2 is a partial perspective view of the air obstructing means incorporated in the power plant of Figure 1 with said means moved to its air obstructing position;

Figure 3 is a sectional view taken along line 3—3 of Figures 1 and 2 with the air obstructing fingers in their retracted positions;

Figure 4 is a diagrammatic view of the control mechanism embodied in Figure 1;

Figure 5 illustrates a modification of the air obstructing means of Figures 1 and 2.

Figure 6 illustrates a modification of the control mechanism of Figure 4; and

Figure 7 illustrates a further modification of the control mechanism of Figure 4.

Referring to the drawing, a gas turbine power plant 10 comprises a compressor 12 having a forwardly directed annular air intake duct 14, said compressor supplying compressed air into a combustion chamber 16. Fuel nozzles 18 supply fuel into the combustion chamber 16 for combustion with said air. The combustion gases discharge from the chamber 16 against the blades 20 of a turbine 22, said turbine being drivably connected to the compressor 12. From the turbine blades 20, the combustion gases discharge rearwardly therefrom through an exhaust duct or nozzle 24. The power plant is disposed within an outer casing or cowl 26. The gas turbine power plant so far described is quite conventional.

An annular ring 28 forms the outer wall of the forward end of the intake duct 14, said ring being provided with a plurality of axially extending recesses 30. A plurality of circular segments 32 are disposed in end to end relation adjacent the forward edge of the ring 28. Each segment 32 is pivotally supported from the ring 28 by hinge pins 34 carried by bosses 35 on said ring so that each segment is pivotally movable about an axis disposed perpendicular to a radius disposed approximately midway between the ends of said segment. Each segment 30 is also provided with extensions or fingers 36 which are arranged to be received within the recesses 30, as best seen in Figure 3. The arrangement is such that when the fingers 36 are received within the recesses 30, the segments 32 with their fingers 36 and the ring 28 form a smooth annular outer wall for a forward portion of the duct 14.

Each segment 32 is also provided with an arm 38 extending outwardly therefrom and a rod 40 is secured to each of said arms for swinging the associated segment 32 about its hinge axis so as to move or extend its fingers 36 across the duct 14, for example to the position illustrated in Figure 2. When the fingers 36 are extended, they obstruct the air flow into the duct 14 and spoil the ram pressure of the air at the entrance to the compressor 12, the magnitude of said action depending on the degree to which said fingers are extended.

As illustrated in Figure 4, each rod 40 is connected by a piston rod to a fluid motor piston, one of said piston rods and its piston being designated by reference characters 41 and 42 respectively and the other piston rods and their pistons by reference characters 41a and 42a. The pistons 42a are arranged to follow the motion of the piston 42 so that the piston 42 may be termed the master piston and the pistons 42a the slave pistons.

The pistons 42 and 42a comprise the power members of servo mechanisms disposed within housings 44 and 44a respectively. The details of these servo mechanisms are illustrated in Figure 4. The housing 44 has a bore 46 within which the master piston 42 is slidable. The housing 44 also has a second bore 48 within which a valve sleeve 50 is slidable. A valve 52 is slidable within the sleeve 50, said valve having an annular groove 54 intermediate its ends and having a rod 56 extending through one end of the sleeve 50 to connect the valve to a lever 58 at a point 60 intermediate the lever ends. One end 62 of the lever 58 is pivotally connected to the piston rod 41 and its other end is pivotally connected to the housing 44 at 64. Because the piston 42 and valve 52 are interconnected by the lever 58, any motion of the piston 42 is accompanied by a proportional motion of the valve 52.

The ends of the sleeve 50 are closed and one end of the bore 48 within which said sleeve is slidable is subjected to the pressure within the combustion chamber 16 through a conduit 66. The other end of said bore 48 is subjected to the pressure within the annular space 68 between the combustion chamber and the cowl 26 through a passage 70. A compression spring 72 is also disposed within said latter end of the bore 48 for urging the sleeve 50 against the combustion pressure. The spring 72 seats against a plug 74 which is screwed into the bore 48 for initial adjustment against said spring.

A suitable fluid under pressure is supplied to the annular groove 54 through a conduit 76, a linear groove 78 and a radial hole 80 through the sleeve 50. The left end of the bore within the sleeve 50 is connected to a drain passage 82 through a radial hole 84 in said sleeve and a linear groove 86 in the housing 44. The right end of the bore in the sleeve 50 is also connected to the drain passage 82 through a radial hole 90, in said sleeve, and a linear groove 92 in the housing 44. The arrangement is such that both ends of the bore within the sleeve 50 are continuously vented to the drain passage 82 while the annulus 54, defined by the valve 52 within said sleeve, is always connected to the fluid supply conduit 76.

The sleeve 50 is also provided with radial holes 94 and 96. The hole 94 communicates with the adjacent end of the piston bore 46 through a linear groove 98 and a passage 100 and the hole 96 communicates with the other end of said piston bore through a linear groove 102 and a passage 104.

With the above described construction, when the valve 52 closes the holes 94 and 96, both ends of the piston bore 46 are closed so that the piston 42 is in a stable or fixed position. When the pressure within the combustion chamber 16 increases to an extent sufficient to move the sleeve 50 to the right against the spring 72, the hole 94 is placed in communication with the annular groove 54 and the supply conduit 76 whereupon fluid under pressure is admitted from the annular groove 54 through the hole 94 and passage 100 to the left end of the piston bore 46. At the same time the hole 96 is placed in communication with the continuously vented right end of the bore in the sleeve 50 thereby venting the right end of the piston bore 46 through the passage 104 and hole 96. The fluid pressure differential acting on the piston 42 moves said piston to the right to extend the associated fingers 36 until, through the lever 58, the valve 52 is moved to the right a sufficient amount to follow up the movement of the sleeve 50, that is until the valve 52 again closes both holes 94 and 96. In this way movement of the sleeve 50 results in a corresponding movement of the piston 42 and the valve 52.

Each slave piston 42a and its associated control valves comprises a slave unit which is similar to the master unit comprising the piston 42 and its associated control valves so that the parts of each slave unit have been designated by the same reference numerals as the corresponding parts of the master unit but with the letter "a" added thereto. Thus each valve sleeve 50a is movable to control its piston 42a, said piston in turn effecting a follow up movement of its associated valve 52a relative to its sleeve 50a in the same manner that the sleeve 50 controls the piston 42 and associated valve 52. Accordingly no further description of the operation of each slave unit is considered necessary.

In order to control the slave pistons 42a, the master piston 42 is connected to a ring 110 disposed and rotatable about the duct 14 in the annular space 68, a development of said ring being illustrated in Figure 4. For this latter purpose, the lever 58 is provided with an arm 112 to form a bell crank, said arm 112 being pivotally connected to the ring 110 for imparting a rotary motion to said ring proportional to the motion of the piston 42. Instead of being controlled by the pressure differential across the walls of the combustion chamber, the valve sleeves 50a, of each slave piston 42a, are connected to the ring 110 by a bell crank lever 114 pivotally mounted on their respective housings 44a. Accordingly, since the slave pistons 42a are controlled by their respective valve sleeves 50a and since said valve sleeves 50a are controlled by the master piston 42, the slave pistons 42a are controlled by said master piston. The lengths of the arms of the bell crank lever 114 are such that the ratio of the magnitude of the motion of each sleeve 50a to that of the master piston 42 is equal to the ratio of the magnitude of the motion of the valve 52 to that of said master piston. With this arrangement when the sleeve 50 moves to effect a movement of the master piston 42, said master piston, through the ring 110 and bell crank levers 114, produces a motion of each sleeve 50a equal to said motion of the sleeve 50. Therefore since the sleeves 50a and their valves 52a control the slave pistons 42a just as the sleeve 50 and valve 52 control the master piston 42, the movements of the slave pistons 42a follow and are equal to the movements of the master piston 42.

When the pressure differential between the combustion chamber 16 and the annular space 68 is below a predetermined value, the master valve sleeve 50 is at the extreme left end of its travel so that the master piston 42 and valve 52 are also at the extreme left end of their travel. In addition since the master piston 42 is connected to the valve sleeves 50a of the slave pistons 42a, each sleeve 50a and its associated valve 52a and slave piston 42a are also at the extreme left ends of their travel. Accordingly all the fingers 36 are then completely retracted. If the pressure differential across the walls of the combustion chamber increases above this predetermined value, the sleeve 50 is moved to the right against this pressure differential and the master piston 42 and the slave pistons 42a all move to the right to extend the fingers 36 across the duct 14, the degree of which said fingers are extended depending on the extent to which the valve sleeve 50 has been moved by the pressure differential across the walls of the combustion chamber. Thus the fingers 36 are normally completely retracted, said fingers only being extended when the pressure differential across the walls of the combustion chamber exceeds a predetermined value and then the fingers are extended only to a degree depending on the amount said pressure differential exceeds said predetermined value. When the fingers 36 are extended they obstruct the air flow into the duct 114 and spoil the ram pressure at the entrance to the compressor 12 thereby effecting a reduction in the turbine combustion chamber pressure. In this way the fingers 36 automatically operate to prevent excessive combustion chamber pressures.

As illustrated, the fingers 36 are controlled by the pressure differential between the pressure within the combustion chamber 16 and that within the annular space 68. Obviously however, said control may be responsive to some equivalent pressure differential, as for example to the pressure differential between the combustion chamber pressure and the pressure of the surrounding atmosphere or to the pressure differential between the combustion chamber pressure and the pressure in the exhaust nozzle or duct 24.

The motor and control means for operating the air obstructing fingers 36 has been described in considerable detail in order to disclose an operative structure. Obviously, however, the invention is not limited to the specific structure described. Thus any motor and control means which would operate to extend the fingers 36 to a degree determined by the extent to which the combustion pressure exceeds a predetermined value could be substituted for the motor and control means disclosed. For example an electric motor system could obviously be substituted for the fluid system disclosed. Furthermore where a variable pressure is used to control the position of a member, the pressure itself may furnish the power for moving said member or a servo-valve mechanism may be provided wherein said pressure only controls the position of the servo-valve which in turn controls the application of another pressure to said member. Accordingly, it is obvious that instead of the servo-mechanism illustrated, the combustion chamber pressure itself could act against and furnish the power for moving the piston 42 and for moving the pistons 42a under the control of the piston 42. In addition the air obstructing fingers 36 need not be as disclosed but any means movable across the air intake duct 14 could be used, as for example the structure schematically illustrated in Figure 5. In fact it is obvious that the air obstructing means need not be in the form of fingers but may comprise any structure which can be moved into and out of a position for obstructing air flow into the duct 14.

In Figure 5 a group of air obstructing fingers 120 are supported by a link mechanism comprising a pair of links 122 and 124 having fixed pivots 126 and 128 respectively, a plurality of said groups of fingers 120 being circumferentially spaced about the intake duct 14. Each link 122 is integral with an arm 130 to form a bell crank lever, said arm being connected to a rod 132 which may be operated by the mechanism similar to that disclosed for operating the piston rods 40 of Figures 1 to 4. In Figure 5 the full lines indicate the retracted positions of the fingers 120 while the dashed lines indicate their fully extended positions. With the arrangement of Figures 1 to 4 the air flowing through the duct 14 opposes extension of the fingers 36 whereas with the arrangement of Figure 5 said air flow, to a small extent, helps said extension. Accordingly it is obvious that the air obstructing fingers may be mounted so that the air flowing through the duct 14 has little or no effect on extension and/or retraction of said fingers, or said air flow assists or resists extension and/or retraction of said fingers. For example in Figure 5 whether the air flow assists or resists extension of the fingers 120 depends on the relative lengths of the links 122 and 124.

As illustrated the gas turbine power plant is provided with a conventional aircraft propeller 134 so that at least some or all of the thrust is produced by said propeller. Such a power plant is termed a turbo-prop engine. Obviously, however, the invention also can be used in a gas turbine power plant having no aircraft propeller and in which all the thrust is produced by the jet propulsive effect of the exhaust gases, that is in a turbo-jet engine.

As is conventional, the aircraft propeller 134 is driven by the turbine through a reduction gear not shown but disposed within the space surrounded by the duct 14. Since the air obstructing fingers 36 and 120 automatically operate to limit the combustion chamber pressure said fingers also limit the maximum available turbine power output thereby limiting the power which can be transmitted through the propeller reduction gear. Accordingly the air obstructing fingers can be provided not only for preventing excessive combustion chamber pressures but also for preventing excessive loads on the propeller reduction gear.

The maximum available power output of a gas turbine power plant increases with decrease in the temperature of the air entering the duct 14. Accordingly where the air obstructing fingers are used to limit the maximum load on the propeller reduction gear, the control system may be biased so as to effect extension of said fingers at lower combustion chamber pressures in response to a decrease in the temperature of the surrounding air. Such a modification is schematically illustrated in Figure 6 which is identical to the system of Figures 1 to 4 except the plug 74 has been replaced by a plug 140 which is slidable within the bore 48, its position being controlled by a cam 142. The cam 142 is pivotally mounted at 144 and is provided with an arm 146 extending therefrom. The outer end of the arm 146 is pivotally connected to a bellows 148 the interior of which communicates with a bulb 150 through a tube 152. The bellows 148, the bulb 150 and tube 152 contain a fluid which expands with increase in temperature and the bulb 150 is exposed to the temperature of the air entering or in the duct 14. The arrangement is such that as the temperature of the air entering the duct 14 decreases below a predetermined value, the bellows 148 contracts thereby rotating the cam 142 clockwise to decrease the compression in the spring 72. With a decrease in the compression of the spring 72 a smaller pressure differential across the walls of the combustion chamber will be effective to move the valve sleeve 50 to extend the air obstructing fingers 36.

Instead of using the temperature of the air entering the duct 14 to control the spring 72, as in Figure 6, a pressure varying with the torque or power output of the propeller reduction gear could be used. Such a pressure is generally available on aircraft engines, for example by means of a torquemeter such as disclosed in Patent No. 2,289,285 to R. Chilton. This modification is illustrated in Figure 7 in which a piston 160 is urged to the right with a force proportional to the torque transmitted by the propeller reduction gear drive. Movement of the piston by this torque proportional force is opposed by a fluid pressure supplied by a pump 162, the piston being movable to control a vent 164 so that said fluid pressure balances the torque proportional force acting on the piston. With this arrangement the output pressure of the pump 162 is proportional to the torque output of the propeller reduction gear torque. Such a fluid pressure torquemeter is more fully disclosed in the aforementioned patent to R. Chilton. This torque proportional fluid pressure is transmitted to a bellows 166 which is connected to an arm 168 extending from a cam 170. The cam 170 controls the compression of the spring 48 so that an increase in said torque above a predetermined value results in a decrease in said spring compression.

If the primary purpose of the air obstructing fingers is to limit the power transmitted by the propeller reduction gear, then the air obstructing fingers could be controlled by a pressure differential proportional to the torque transmitted by said reduction gear instead of by the pressure differential across the walls of the combustion chamber. For example in Figures 1 to 4, instead of connecting the conduit 66 to the combustion chamber it could be connected to a pressure proportional to said torque for example to the output pressure of the pump 162 of Figure 6.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination with an aircraft gas turbine power plant having a combustion chamber, an annular forwardly directed air intake duct having an annular inlet opening disposed adjacent to the forward end of said power plant, an air compressor for supplying said combustion chamber with air compressed from said duct for combustion with fuel in said chamber, and a turbine drivably connected to said compressor and arranged to be driven by combustion gases from said chamber; means having a first position in which relatively little obstruction is offered thereby to air flowing through said duct to said compressor, said means being movable from said first position for obstructing said air flow; means responsive to a condition indicative of the power output of said power plant; and means controlled by said responsive means for moving said movable means from said first position so as to obstruct said air flow when said condition goes beyond a predetermined value in a power increasing direction.

2. In combination with an aircraft gas turbine power plant having a combustion chamber, an annular forwardly directed air intake duct having an annular inlet opening disposed adjacent to the forward end of said power plant, an air compressor for supplying said combustion chamber with air compressed from said duct for combustion with fuel in said chamber, and a turbine drivably connected to said compressor and arranged to be driven by combustion gases from said chamber; means having a first position in which relatively little obstruction is offered thereby to air-flow through said duct to said compressor, said means being movable from said first position for obstructing said air flow; means responsive to pressure within said combustion chamber; and means controlled by said responsive means for moving said movable means from said first position so as to obstruct said air flow when said pressure exceeds a predetermined value.

3. In combination with an aircraft gas turbine power plant having a combustion chamber, a forwardly directed air intake duct, an air compressor for supplying said combustion chamber with air compressed from said duct for combustion with fuel in said chamber, and a turbine drivably connected to said compressor and arranged to be driven by combustion gases from said chamber; means having a first position in which relatively little obstruction is offered thereby to air-flow through said duct to said compressor, said means being movable from said first position for obstructing said air flow; means responsive to pressure within said combustion chamber; and means controlled by said responsive means for moving said movable means from said first position so as to obstruct said air-flow to an extent determined by the extent to which said pressure exceeds a predetermined value.

4. In combination with an aircraft gas turbine power plant having a combustion chamber, a forwardly directed air intake duct, an air compressor for supplying said combustion chamber with air compressed from said duct for combustion with fuel in said chamber, and a turbine drivably connected to said compressor and arranged to be driven by combustion gases from said chamber; means having a first position in which relatively little obstruction is offered thereby to air-flow through said duct to said compressor, said means being movable from said first position for obstructing said air-flow; means responsive to pressure within said combustion chamber; means controlled by said responsive means for moving said movable means from said first position so as to obstruct said air-flow when said pressure exceeds a predetermined value; and means for automatically decreasing said predetermined value with decrease of the temperature of the air entering said duct.

5. In combination with an aircraft gas turbine power plant having a combustion chamber, a forwardly directed air intake duct, an air compressor for supplying said combustion chamber with air compressed from said duct for combustion with fuel in said chamber, an aircraft propeller, and a turbine drivably connected to said compressor and propeller and arranged to be driven by combustion gases from said chamber; means having a first position in which relatively little obstruction is offered thereby to air-flow through said duct to said compressor, said means being movable from said first position for obstructing said air-flow; means responsive to pressure within said combustion chamber; means controlled by said responsive means for moving said movable means from said first position so as to obstruct said air-flow when said pressure exceeds a predetermined value; and means for automatically decreasing said predetermined value with increase in the torque absorbed by said propeller.

6. In combination with an aircraft gas turbine power plant having a combustion chamber, an annular forwardly directed air intake duct disposed adjacent to the forward end of said power plant, an air compressor for supplying said combustion chamber with air compressed from said duct for combustion with fuel in said chamber and a turbine drivably connected to said compressor and arranged to be driven by combustion gases from said chamber; means having a first position in which relatively little obstruction is offered thereby to air-flow through said duct to said compressor, said means being movable from said first position for obstructing said air-flow; means responsive to pressure within said combustion chamber; means controlled by said pressure responsive means for moving said movable means from said first position so as to obstruct said air-flow when said pressure exceeds a predetermined value; means responsive to the magnitude of a condition affecting the power output of said power plant; and means controlled by said condition responsive means for decreasing said predetermined value of pressure when the magnitude of said condition changes a predetermined extent in a power increasing direction.

WILLIAM G. OVENS.

REFERENCES CITED

The following references are of record in the file of this patent:

UNITED STATES PATENTS

| Number | Name | Date |
|---|---|---|
| 1,052,588 | Janicki | Feb. 11, 1913 |
| 2,225,310 | Lindhagen et al. | Dec. 17, 1940 |
| 2,447,696 | Forsyth | Aug. 24, 1948 |